(12) United States Patent
D'Hulster et al.

(10) Patent No.: US 9,074,719 B2
(45) Date of Patent: Jul. 7, 2015

(54) APPARATUS AND METHOD FOR HEAT CURING OF PIPE LINERS

(75) Inventors: Gerald Scott D'Hulster, Clearwater, FL (US); James Gould, Clearwater, FL (US)

(73) Assignee: Perma-Liner Industries, LLC, Clearwater, FL (US)

( * ) Notice: Subject to any disclaimer, the term of this patent is extended or adjusted under 35 U.S.C. 154(b) by 658 days.

(21) Appl. No.: 13/195,566

(22) Filed: Aug. 1, 2011

(65) Prior Publication Data

US 2012/0060957 A1  Mar. 15, 2012

Related U.S. Application Data

(60) Provisional application No. 61/369,439, filed on Jul. 30, 2010, provisional application No. 61/417,878, filed on Nov. 29, 2010.

(51) Int. Cl.
*B29C 73/00* (2006.01)
*B32B 43/00* (2006.01)
*B29C 65/00* (2006.01)
(Continued)

(52) U.S. Cl.
CPC ............. *F16L 55/1651* (2013.01); *B29C 63/26* (2013.01); *B29C 63/34* (2013.01); *B29C 63/36* (2013.01); *B29C 63/0069* (2013.01); *B29C 65/4835* (2013.01); *B29C 66/5221* (2013.01)

(58) Field of Classification Search
CPC ... F16L 55/1651; F16L 55/179; F16L 55/165; F16L 55/1654; B29C 63/26; B29C 63/34; B29C 63/36; B29C 63/0069; B29C 65/48; B29C 65/4835; B29C 66/5221; B29L 2023/006; E03F 2003/065

USPC ............ 156/60, 94, 156, 160, 165, 166, 176, 156/178, 196, 199, 212, 214, 215, 217, 218, 156/229, 285, 287, 293, 294, 296, 303.1, 156/307.1, 307.3, 307.7, 324; 138/97, 98
See application file for complete search history.

(56) References Cited

U.S. PATENT DOCUMENTS 5,490,964 A * 2/1996 Kamiyama et al. ........ 264/36.17
7,360,559 B2    4/2008 Driver
(Continued)

FOREIGN PATENT DOCUMENTS

JP          06-114938      4/1994
KR    10-2007-0047211      5/2007

*Primary Examiner* — Philip Tucker
*Assistant Examiner* — Brian R Slawski
(74) *Attorney, Agent, or Firm* — Ryan N. Carter

(57) ABSTRACT

An apparatus and method that accelerates curing of resin in a liner for a buried pipe includes an air inversion unit connected to an air compressor. The apparatus include a curing cap having an inflation port, a curing port and a drainage port. A remote source of pressurized fluid is placed in fluid communication with the inflation port. The apparatus also includes a manifold having an outlet, a first inlet in valved fluid communication with a heated fluid source, a second inlet in valved fluid communication with a pressurized fluid source and a third inlet in valved fluid communication with the drainage port. A flexible tube is slidably received by the curing port while maintaining a substantially fluid-tight seal. The flexible tube has a first end in fluid communication with the outlet of the manifold and the second end has a substantially spherical guide thereon. The second end of the flexible tube also includes a plurality of perforations to allow fluids to pass there through.

15 Claims, 4 Drawing Sheets

(51) Int. Cl.
*B32B 37/00* (2006.01)
*C09J 5/02* (2006.01)
*F16L 55/16* (2006.01)
*F16L 55/165* (2006.01)
*B29C 63/26* (2006.01)
*B29C 63/34* (2006.01)
*B29C 63/36* (2006.01)
*B29C 63/00* (2006.01)
*B29C 65/48* (2006.01)

(56) References Cited

U.S. PATENT DOCUMENTS

2002/0020453 A1* 2/2002 Kamiyama et al. ............. 138/98
2005/0098909 A1 5/2005 Kiest
2007/0095472 A1* 5/2007 Kamiyama et al. ........... 156/294

* cited by examiner

APPARATUS AND METHOD FOR HEAT CURING OF PIPE LINERS

CROSS REFERENCE TO RELATED APPLICATIONS

This application is a Non-Provisional Application of U.S. Provisional Application No. 61/369,439, filed Jul. 30, 2010, and of co-pending U.S. Provisional Application No. 61/417,878, filed Nov. 29, 2010, both of which are incorporated herein reference in its entirety.

BACKGROUND OF THE INVENTION

This invention relates, generally, to pipe liners that are used to repair buried pipes without excavation. More particularly, it relates to an apparatus and method that reduces the amount of time required to complete such repairs.

Methods of rehabilitating damaged pipes by inverting an tubular liner impregnated with curable resin are known. The known methods of installing a liner to repair a buried pipe, while it remains underground, involve inserting a liner into the pipe and forcing the liner into engagement with the inner walls of the pipe by inflating a bladder. The liner is impregnated with curable resins prior to insertion and the bladder must remain inflated until the resin cures. The time required for resin to cure, however, ranges from three to eight hours, depending upon ambient temperatures. Thus there is a need for an apparatus and method that provides a shorter curing time regardless of ambient temperatures.

SUMMARY OF THE INVENTION

The long-standing but heretofore unfulfilled need for an apparatus and method that shortens resin curing times is now met by a new, useful, and non-obvious invention.

The apparatus includes a curing cap having an inflation port, a curing port and a drainage port. A remote source of pressurized fluid (preferably air) is placed in fluid communication with the inflation port. The apparatus also includes a manifold having an outlet, a first inlet in valved fluid communication with a heated fluid source, a second inlet in valved fluid communication with a pressurized fluid source and a third inlet in valved fluid communication with the drainage port.

A flexible curing tube is slidably received by the curing port while maintaining a substantially fluid-tight seal. The flexible tube has a first end in fluid communication with (via the manifold) a source of heated fluid (such as water or steam) and the second end has a substantially spherical guide thereon. The second end of the flexible tube also includes a plurality of perforations to allow fluids to pass there through. During curing operations, the heated fluid flows through the flexible tube and exits, through said perforations, into the interior of an inverted liner tube.

BRIEF DESCRIPTION OF THE DRAWINGS

For a fuller understanding of the nature and objects of the invention, reference should be made to the following detailed disclosure, taken in connection with the accompanying drawings, in which:

FIG. 4A is a side plan view of an illustrative curing cap installed in an inversion head with the flexible tube extending there through.

DETAILED DESCRIPTION OF THE PREFERRED EMBODIMENT

Figure 1:
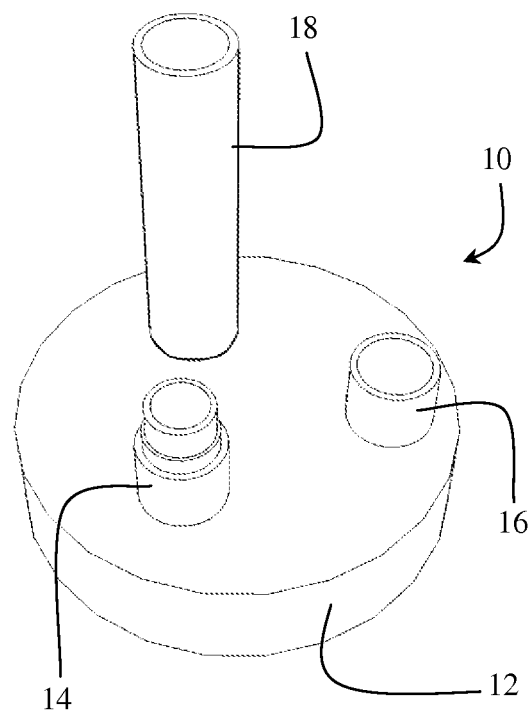
FIG. 1 is a perspective view of an illustrative curing cap.
Figure 2:
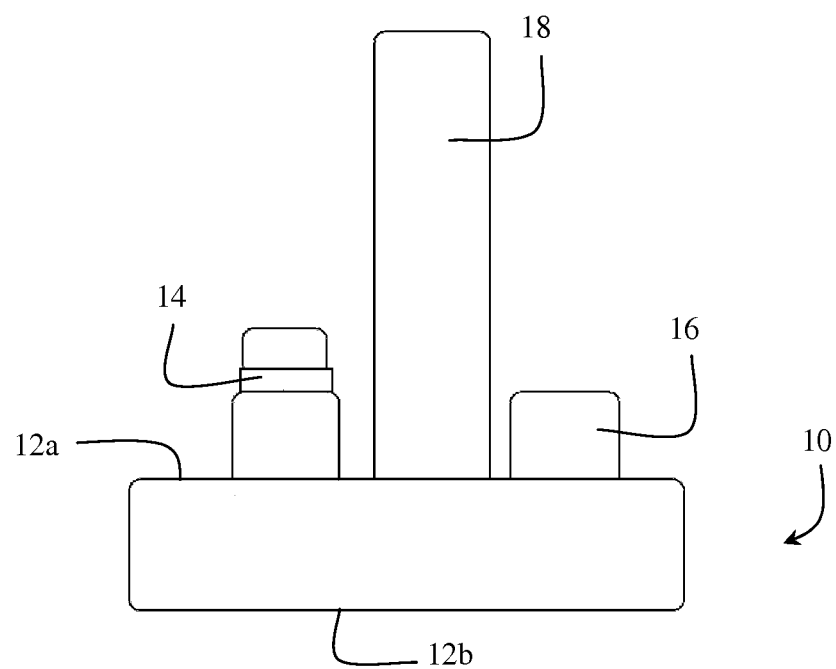
FIG. 2 is a side plan view of an illustrative curing cap.
Figure 3A:
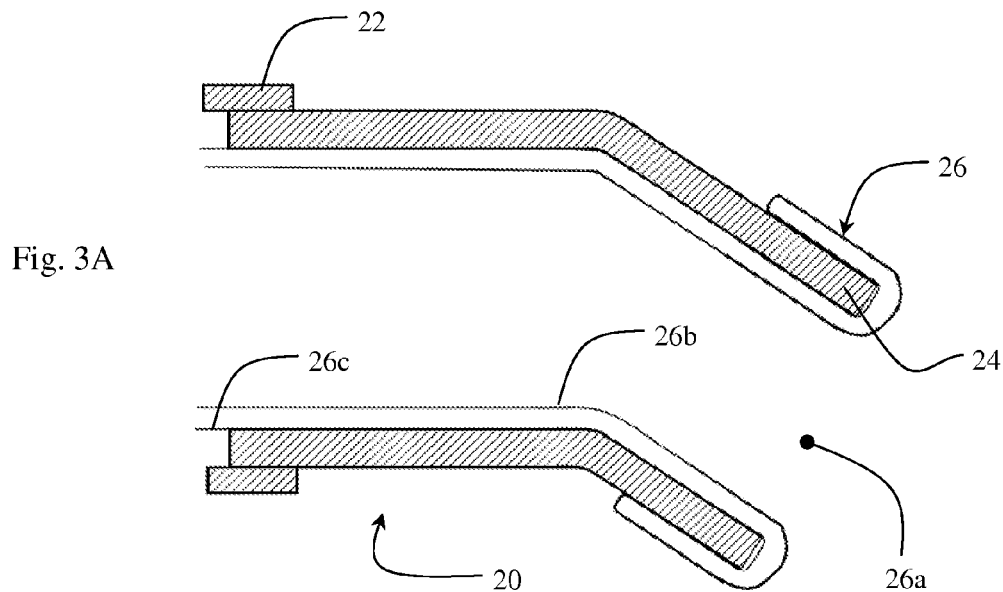
FIG. 3A is a side plan view of an inversion head, with an un-inverted tubular liner positioned thereon.

While the present invention is shown for use with sewer pipeline repair, the present invention can be utilized for repairing other types of pipes, ducts, tunnels and shafts, such as gas, water, oil, steam and compressed air conduits. FIGS. 1 and 2 depict an illustrative embodiment of the novel curing cap which is denoted as a whole by the reference numeral 10. Curing cap 10 includes substantially circular body 12 having an outer side 12a and inner side 12b. Outer side 12a further includes inflation port 14, curing port 16 and discharge port 18. All ports are preferably arranged to provide unidirectional fluid communication between outer side 12a and inner side 12b of circular body 12. Inner side 12b of circular body 12 is received by intake 22 of inversion head 20 (FIG. 3A). Discharge end 24 releasably engages the interior of open end 26a of liner tube 26.

Two types of liner tubes are commonly used. The first type of liner comprises a felt or fiberglass lining, having a closed end and an open end impregnated with a curable resin. The second type includes a lining composition of two (2) main layers; a first layer comprising an inflatable bladder having a closed end and an open end, and a second layer of felt or fiberglass lining that is impregnated with a curable resin.

Liner tube 26 preferably comprises a felt layer (26b) and a plastic layer (26c) as is known in the art. The felt layer is adapted to absorb a liquid resin, and the plastic layer is adapted to provide an impervious smooth continuous surface. Prior to inverting the liner tube, the plastic layer is located on the outside of the liner tube and the felt layer is located on the inside. During the inversion process (described below), the liner tube 26 is inverted so that the felt layer is on the outside of the liner tube and the smooth plastic layer is on the inside of the liner tube. Use of an impermeable coating on the liner tube allows the liner tube to be inflated and inverted without the use of a separate bladder. In embodiments using an inflatable bladder, the bladder overlies the felt lining and is contact with plastic layer 26c.

Prior to inversion, intake 22 of inversion head 20 is connected (via a tubular conduit) to a liner dispensing unit (which normally include a source of pressurized air). The dispensing unit holds the length of resin soaked liner prior to delivery. During inversion, the air under pressure flows through the system from the dispensing unit toward inversion head 20.

Figure 3B:
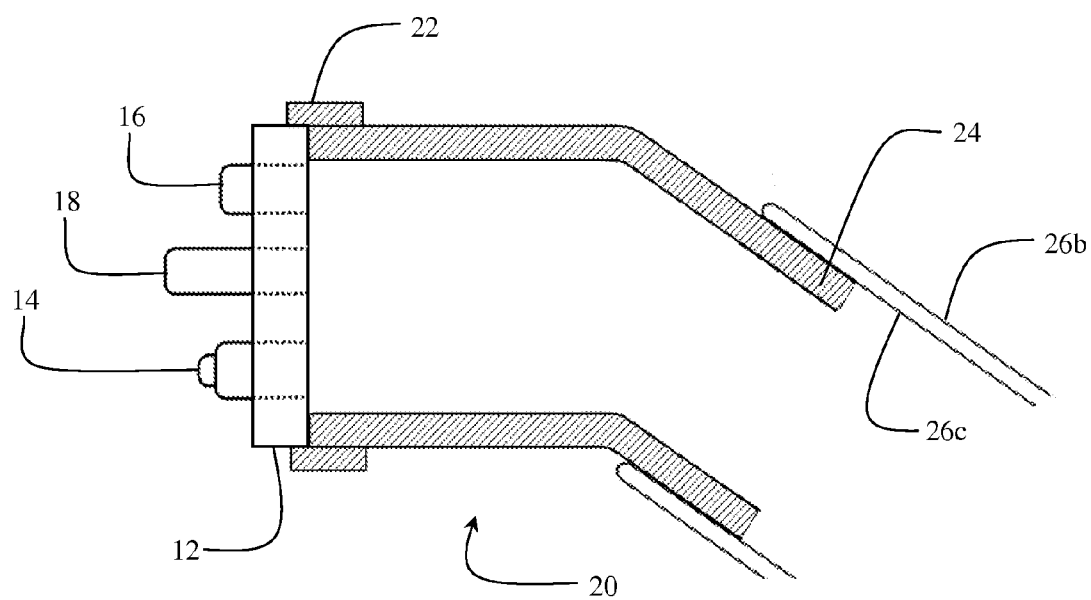
FIG. 3B is a side plan view of an illustrative curing cap installed in an inversion head, which is in turn installed in the open end of an liner tube.

As shown in FIG. 3A, open end 26a of liner tube 26 is fitted over discharge end 24 of inversion head 20 and is secured in place to create an airtight connection there around ensuring the air under pressure causes the closed leading end of liner tube 26 (not shown) to follow a path of travel through curing cap 20 into the interior or lumen of the pipe, thereby inverting said liner as said closed end is propelled to the distal end of the pipe by said heated fluid under pressure (see FIG. 3B).

Accordingly, liner tube 26 is fully inverted along its entire extent when the closed end of liner tube 26 reaches the distal end of the pipe. The rubber layer or uncoated lining layer now forms the interior surface of liner tube 26 and the resin-impregnated outer layer now forms the exterior layer and is pressed against the inner sidewalls of the pipe by the pressure of said gaseous or liquid fluid.

Air from the inversion compressor further causes liner 26 (or bladder/liner combination) to expand radially so that the resin coated surface of liner 26 comes into contact with the interior of the pipe to be repaired. Air pressure is continued, either directly against the interior of the liner (or inflatable bladder) to force the resin-coated surface of liner 26 into contact with the interior of the pipe.

Figure 4A:
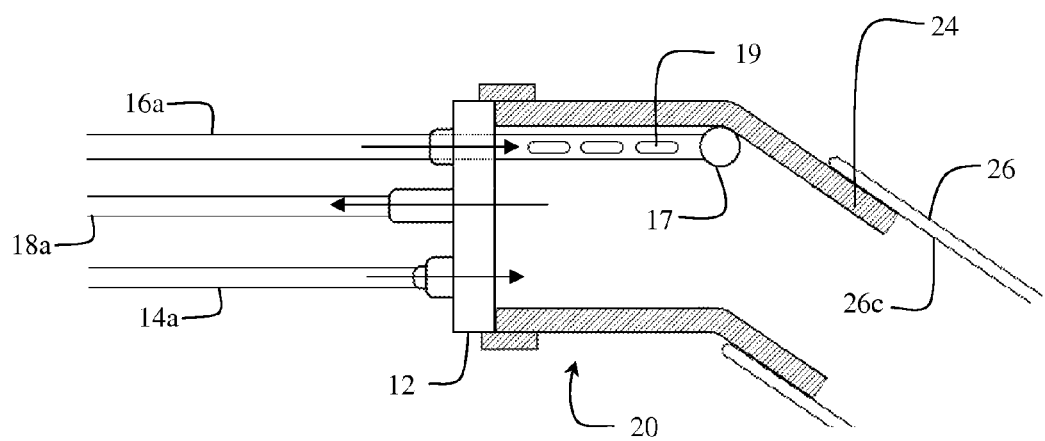
Figure 4B:
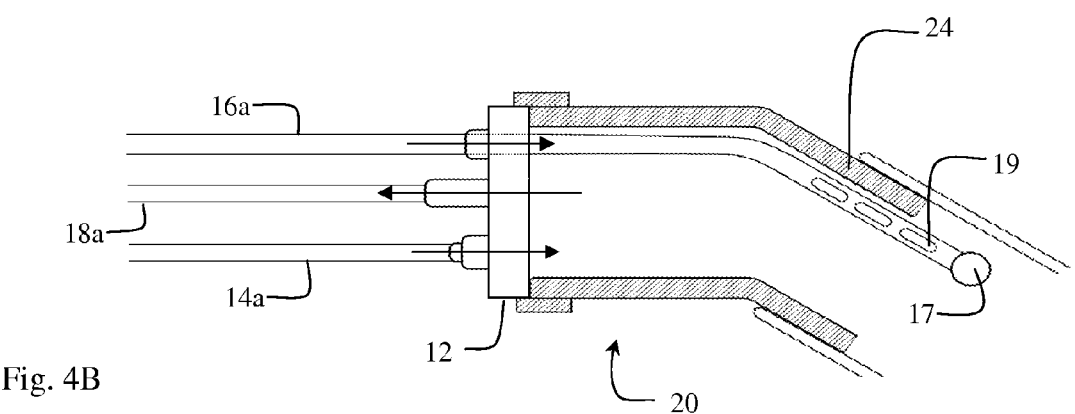
FIG. 4B is a side plan view of an illustrative curing cap installed in an inversion head with the flexible tube extending there through and into the lumen of the tubular liner.

Once liner tube 26 is fully inverted, inversion head 20 is uncoupled from the dispensing unit and compressed air source. Turning now to FIG. 4A, curing cap 10 is then coupled with intake 22 of curing cap 20 (FIG. 3B). Inflation port 14 is connected to an air compressor, not shown, via airline 14a. Air from the compressor maintains the pressure within liner 26 to keep the resin-coated surface (26b) of liner 26 in contact with the interior of the pipe.

Curing port 16 is connected, via flexible curing tube 16a, to manifold 30 (see FIG. 5), which is in turn in fluid communication with a heated fluid source and an air compressor, not depicted. In an alternative embodiment, however, it is possible to use a single air compressor connected to the manifold to provide connections to both inflation port 14 and curing port 16. Curing port 16 is preferably of a slip-ring configuration, but can be adapted for any configuration that allows curing curing tube 16a to slide through curing port 16 while maintaining a substantially fluid-tight seal.

Drainage port 18 is also connected to manifold 30 and provides fluid communication, via drainage line 18a, from the interior of the pipe outward to manifold 30.

Figure 5:
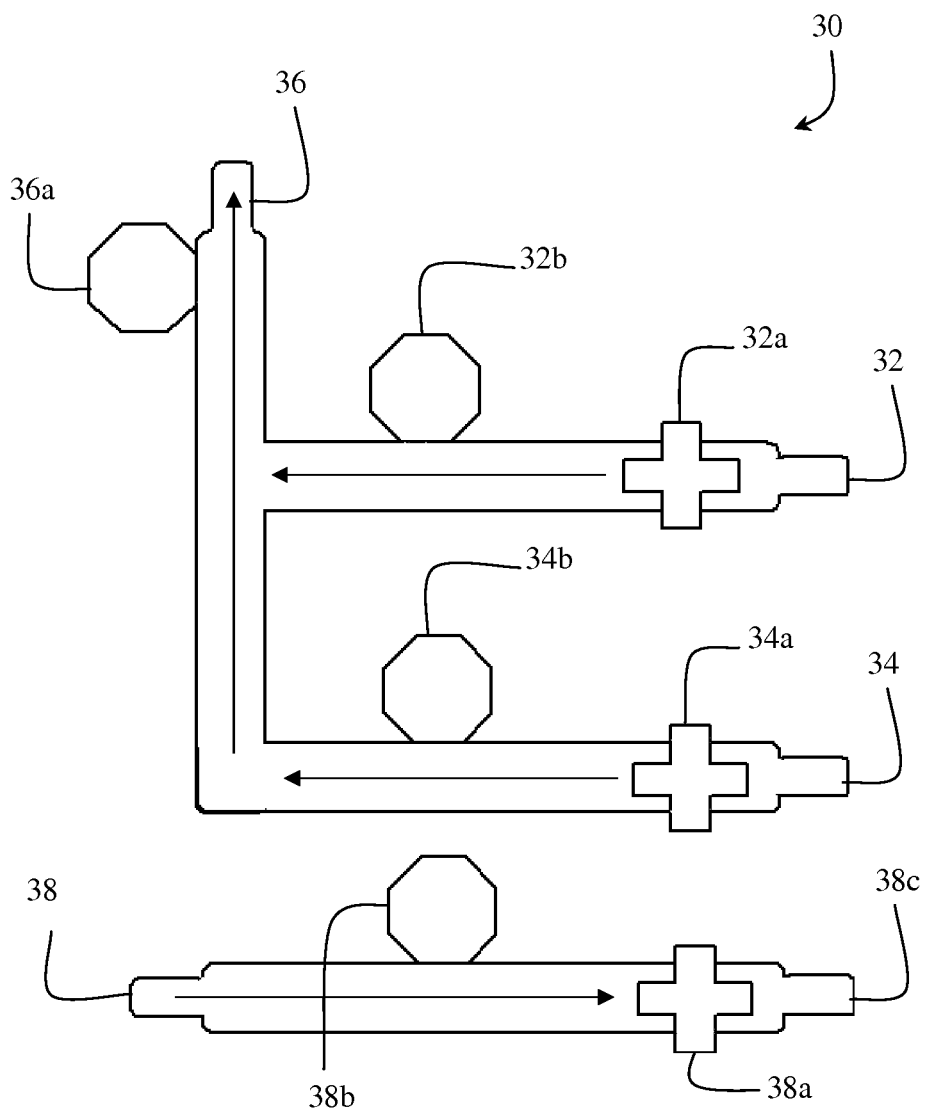
FIG. 5 is a diagrammatic view of an illustrative manifold.

Manifold 30, FIG. 5, includes heat inlet 32, air inlet 34 and outlet 36. Heat inlet 32 is in fluid communication with a heating source which provides heated fluid (i.e. hot water or steam) to the system. The flow of heated fluid into the system is controlled by heat valve 32a, and the temperature and/or pressure of the heated fluid is monitored by gauge 32b. Air inlet 34 is in fluid communication with a drainage air compressor which provides air, under pressure, to the system. The flow of air under pressure into the system is controlled by air valve 34a, and the temperature and/or pressure of the air is monitored by gauge 34b. As previously stated, the drainage air compressor can be replaced by the inversion air compressor using linkages as know in the art. Both heat fluid inlet 32 and air inlet 34 are in open fluid communication with outlet valve 36. For example, when heat valve 32a is open then heated fluid is permitted to pass through manifold 30 thereby exiting outlet 36 and entering the system via curing tube 16a.

Manifold 30 also includes drainage inlet 38, connected to drainage line 18, which further comprises drainage valve 38a and temperature/pressure gauge 38b. Fluids leaving the system via drainage line 18a can be monitored via gauge 38b and disposed of when safe through drainage outlet 38c.

Another aspect of the inventive method occurs after liner tube 26 has been inverted and is being held against the sides of the pipe under pressure. This aspect includes the steps of inserting curing curing tube 16a into the lumen of liner tube 26, opening heat valve 32 so that heated fluid flows through manifold 30, via outlet 36, into curing curing tube 16a and into the lumen of liner tube 26.

Curing tube 16a is an elongate flexible tube including substantially spherical guide 17 at its distal end. Curing tube 16a also includes a series of perforations (19) proximal to spherical guide 17. Once liner tube 26 is fully extended, curing tube 16a is fed through curing port 16 thereby advancing guide 17 through the lumen of liner tube 26. The substantially spherical shape of guide 17 allows the distal end of the tube to easily navigate corners and bends. Once properly positioned, the heated fluid passes through curing tube 16a and out perforations 19 into the lumen of liner tube 26 near its distal end. This ensures liner tube 26 is heated from the distal (closed) end toward the proximal (open) end.

As the heated fluid fills the lumen of the liner tube from the distal end, the air under pressure used to invert the liner tube is permitted to escape through drainage port 18 and back to manifold 30 via drainage line 18a. Gauge 38a is monitored as the fluids (air under pressure, steam or hot water) pass there through. When the gauge shows the temperature of the drainage fluids are substantially equal to the temperature of the heated fluid entering the system, this indicates that the heated fluid has reached the proximal end of liner tube 26. It can now be assumed liner tube 16 is now substantially filled said heated fluid. Heat valve 32a and drainage valve 38a can then be closed, fully or partially, so that liner tube 26 is not over-pressurized. The resin cures within a significantly abbreviated time because the heat of the heated fluid is conducted by the inflatable bladder (or plastic liner layer (26c) into the resin-impregnated layer (26b) where it acts as a catalyst.

When the resin has sufficiently cured, drainage valve 36a is opened to allow the lumen of the liner tube to be emptied. To facilitate drainage, air valve 34a is opened forcing air under pressure through perforations 19 in the distal end of curing tube 16a. This air under pressure forces any remaining heated fluid through drainage port 18, through line 18a and into drainage inlet 38a. Inversion head 20 and curing cap 10 can be removed once all heated fluids are removed from the lumen of liner tube 26.

All documents cited herein are incorporated herein by reference. The invention is illustrated by the preceding embodiments. These embodiments are provided to aid in the understanding of the invention and are not to be construed as a limitation with regard to the arrangement of the parts shown in the figures or the order of steps provided.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of repairing a damaged section of a pipe, comprising:
   a. providing a tubular liner having an open first end and a substantially closed second end;
   b. impregnating the tubular liner with a curable resin;
   c. inverting the tubular liner into the lumen of the pipe to be repaired;
   d. establishing fluid communication between the open end of the tubular liner and a curing cap, the curing cap comprising a discharge port and a curing port with a flexible tube extending there through;
   e. moving the flexible tube through the interior of the tubular liner to a position where a distal end of the flexible tube is near the closed second end of the tubular liner;

f. passing a heated fluid through the flexible tube and into the interior of the tubular liner near the closed second end of the tubular liner;
g. allowing heat from the heated fluid to contact the curable resin;
h. passing at least a portion of a fluid in the interior of the tubular liner through the drainage port;
i. measuring the temperature of the fluid near the drainage port; and
j. determining whether the heated fluid has reached the open first end of the tubular liner based upon the temperature of the fluid near the drainage port.

2. The method of claim 1 wherein the flexible tube is perforated at its distal end.

3. The method of claim 1 wherein the distal end of the flexible tube is equipped with a substantially spherical guide.

4. The method of claim 1, wherein:
a. the curing cap comprises a substantially circular body having a first side and a second side;
b. the inflation port provides substantially unidirectional fluid communication from the first side to the second side of the curing cap; and
c. the drainage port provides substantially unidirectional fluid communication from the second side to the first side of the curing cap.

5. The method of claim 4, further comprising inflating the tubular liner by passing a pressurized fluid through the inflation port into the interior thereof and pressing said liner into contact with the interior of the pipe prior to passing the heated fluid through the flexible tube.

6. The method of claim 1 further comprising the steps of measuring the temperature of the heated fluid and comparing the temperature of the heated fluid with the temperature of the fluid near the drainage port.

7. The method of claim 1 wherein the step of establishing fluid communication between the liner tube and the curing cap is performed after the inverting step.

8. A method of repairing a damaged section of a pipe, comprising:
a. providing a tubular liner having an open first end and a substantially closed second end;
b. impregnating the tubular liner with a curable resin;
c. connecting the first end of the tubular liner to an inversion head connected to an inversion unit;
d. inverting the tubular liner through the inversion head and into the lumen of the pipe to be repaired;
e. connecting a curing cap to the inversion head, the curing cap comprising a drainage port and a curing port with a flexible tube extending there through;
f. moving the flexible tube through the interior of the tubular liner to a position where a distal end of the flexible tube is near the closed second end of the tubular liner;
g. passing a heated fluid through the flexible tube and into the interior of the tubular liner near the closed second end of the tubular liner; and
h. allowing heat from the heated fluid to contact the curable resin
i. passing at least a portion of a fluid in the interior of the tubular liner through the drainage port;
j. measuring the temperature of the fluid near the drainage port; and
k. determining whether the heated fluid has reached the open first end of the tubular liner based upon the temperature of the fluid near the drainage port.

9. The method of claim 8 wherein the flexible tube is perforated at its distal end.

10. The method of claim 8 wherein the distal end of the flexible tube is substantially spherical.

11. The method of claim 8 further comprising the steps of measuring the temperature of the heated fluid and comparing the temperature of the heated fluid with the temperature of the fluid near the drainage port.

12. A method of repairing a damaged section of a pipe, comprising:
providing a tubular liner;
impregnating the tubular liner with a curable resin;
providing an inflatable bladder surrounding the tubular liner, the bladder having an open first end and a substantially closed second end;
inverting the tubular liner and inflatable bladder into the lumen of the pipe to be repaired such that the tubular liner is in contact with the pipe;
establishing fluid communication between the open end of the bladder and a curing cap, the curing cap comprising a discharge port and a curing port with a flexible tube extending there through;
moving the flexible tube through the interior of the bladder to a position where a distal end of the flexible tube is near the closed second end of the bladder;
passing a heated fluid through the flexible tube and into the interior of the bladder near the closed second end of the bladder;
allowing heat from the heated fluid to contact the curable resin;
passing at least a portion of a fluid in the interior of the bladder through the drainage port;
measuring the temperature of the fluid near the drainage port; and
determining whether the heated fluid has reached the open first end of the tubular liner based upon the temperature of the fluid near the drainage port.

13. The method of claim 12 wherein the flexible tube is perforated at its distal end.

14. The method of claim 12 wherein the distal end of the flexible tube is equipped with a substantially spherical guide.

15. The method of claim 12 further comprising the steps of measuring the temperature of the heated fluid and comparing the temperature of the heated fluid with the temperature of the fluid near the drainage port.

* * * * *